United States Patent [19]

Rivere

[11] 4,062,337
[45] Dec. 13, 1977

[54] ELECTRO-PNEUMATIC DEVICE FOR REGULATING THE SUPPLY OF AIR TO AN INTERNAL COMBUSTION ENGINE

[75] Inventor: Jean-Pierre Rivere, Paris, France

[73] Assignees: Regie Nationale des Usines Renault, Boulogne-Billancourt; Automobiles Peugeot, Paris, both of France

[21] Appl. No.: 612,721

[22] Filed: Sept. 12, 1975

[30] Foreign Application Priority Data

Sept. 26, 1974  France .............................. 74.32501

[51] Int. Cl.$^2$ .......................... F02D 1/04; F01N 3/00
[52] U.S. Cl. .............................. 123/140 MC; 60/276; 123/32 EE; 123/119 D; 123/124 B
[58] Field of Search ........ 123/124 B, 124 R, 140 MC, 123/32 EE, 119 D; 60/276

[56] References Cited

U.S. PATENT DOCUMENTS

| 3,738,341 | 6/1973 | Loos | 123/140 MC |
|---|---|---|---|
| 3,745,768 | 7/1973 | Zechnall | 123/140 MC |
| 3,827,237 | 8/1974 | Linder | 123/140 MC |
| 3,831,564 | 8/1974 | Schmidt | 123/32 EE |
| 3,874,171 | 4/1975 | Schmidt | 60/276 |
| 3,910,241 | 10/1975 | Fujisawa | 123/140 MC |
| 3,911,884 | 10/1975 | Moriya | 123/32 EE |
| 3,926,154 | 12/1975 | Williams | 60/276 |
| 3,927,649 | 12/1975 | Stumpp | 123/140 MC |
| 3,931,710 | 1/1976 | Hartel | 60/276 |
| 3,977,375 | 8/1976 | Laprade | 60/276 |

Primary Examiner—Wendell E. Burns
Assistant Examiner—Daniel J. O'Connor
Attorney, Agent, or Firm—Owen, Wickersham & Erickson

[57] ABSTRACT

An electro-pneumatic device for regulating the supply of air to an internal combustion engine having a carburettor is arranged to supply the air to the engine into a manifold downstream of the carburettor and the air supply is controlled to adjust the richness of the main stream of air and fuel entering the engine to control the richness of the combustible mixture. The device includes a pneumatic regulator valve having two stages in series with each other and the opening and closing of this valve is controlled, to adjust the rate of air supply, by a command pressure produced by connecting the valve alternately to a source of the mixture delivery pressure from the carburettor and a source of higher pressure. This alternate connection is effected by an electrically-operated valve actuated by a signal of square wave form, the frequency of which is a function of engine speed and of a signal delivered by a sensor which senses the composition of the exhaust gases from the engine.

16 Claims, 16 Drawing Figures

ELECTRO-PNEUMATIC DEVICE FOR REGULATING THE SUPPLY OF AIR TO AN INTERNAL COMBUSTION ENGINE

This invention relates to devices for regulating the rate of flow of air injected into the induction pipes or manifolds of internal combustion engines, for influencing the richness of the combustible mixture.

In the operation of internal combustion engines, conventional carburettors, even though highly developed, do not keep the richness of the mixture absolutely constant, a requirement which will soon have to be met in order to satisfy strict non-pollution criteria. Efforts have been made to overcome this difficulty by using electronic fuel injection devices, but although these devices give almost perfect mixture richness control they are very costly in construction.

It has therefore been proposed to retain a conventional carburettor by correcting its imperfections, in that extra air is injected directly into the induction pipe downstream of the carburettor, the rate of flow of extra air being regulated electronically under the control of an exhaust gas composition sensor and a suction-actuated valve influenced by the suction in the carburettor venturi. Unfortunately this suction is proportional to the square of the flow of the air aspirated by the engine and consequently at low engine power outputs, particularly in the engines of motor vehicles being driven in towns, the valve has a low sensitivity unless its suction diaphragm is very large and in this case the sensitivity is too great at high power outputs. Existing corrective devices of this kind, which are quite costly to construct, give unsatisfactory results and are greatly inferior in this regard to electronic fuel injectors.

The aim of the present invention is to provide an improved corrective device, for correcting the imperfections of mixture control provided by conventional carburettors, so that the mixture control is extremely good as it is when electronic fuel injectors are used, and to achieve this without greatly increasing construction costs, or at least while keeping them well below the construction costs of electronic fuel injectors.

To this end, according to this invention, an electro-pneumatic device for controlling the supply of additional air to an internal combustion engine to regulate the richness of the combustible mixture in the engine, the device having a suction controlled valve actuated by an electrically operated valve which is energised by an electronic device responsive to engine speed and to signals from a sensor which senses the exhaust gas composition from the engine, the suction controlled valve being arranged to deliver extra air at predetermined rates of flow to the engine downstream of the carburettor, further includes: firstly, a pneumatic regulator valve comprising two stages in series consisting of an upstream stage in which, in operation, air pressure decreases from atmospheric pressure to an intermediate pressure, and a downstream stage in which the air pressure decreases from the intermediate pressure to the mixture delivery pressure at which the combustible mixture is aspirated by the engine, each stage comprising a slide valve actuated by one or more diaphragms, so that the downstream stage opens a passage by an amount proportional to the difference between a command pressure and the mixture delivery pressure, the upstream stage controlling the difference between the intermediate pressure and the mixture delivery pressure to keep this difference substantially constant, or proportional to the mixture delivery pressure; secondly, a command valve system which produces the command pressure by alternately connecting a chamber in which the command pressure is generated during a first period through a first passage to a source of intermediate pressure, or to the atmosphere, and during a second period through a second passage to a source of mixture delivery pressure; and thirdly, an electronic system which applies to the command valve system an electric signal having a square wave form, the mark/space ratio of which is constant and the mark period of which is a function of engine speed, as indicated by ignition frequency, and a function of a signal delivered by the exhaust gas composition sensor, the function being such that the rate of flow of extra air is at least substantially proportional to the rate of flow of the main stream of air aspirated by the engine, either the space period being longer than the mark period or the second passage having a greater cross-section than the first passage to satisfy the requirements imposed by the constancy of parameters imposed by the pneumatic regulator valve, and that each mark period is less than the time taken for the chamber in which the command pressure is generated to fill completely or empty completely with emptying preponderating over the filling.

The invention includes several variants, in regard to the upstream stage of the regulator valve and the arrangement of the command valve system, as will be explained further below.

An example, with a number of variations, of a device in accordance with the invention will now be described with reference to the accompanying drawings, in which.

Figure 1:
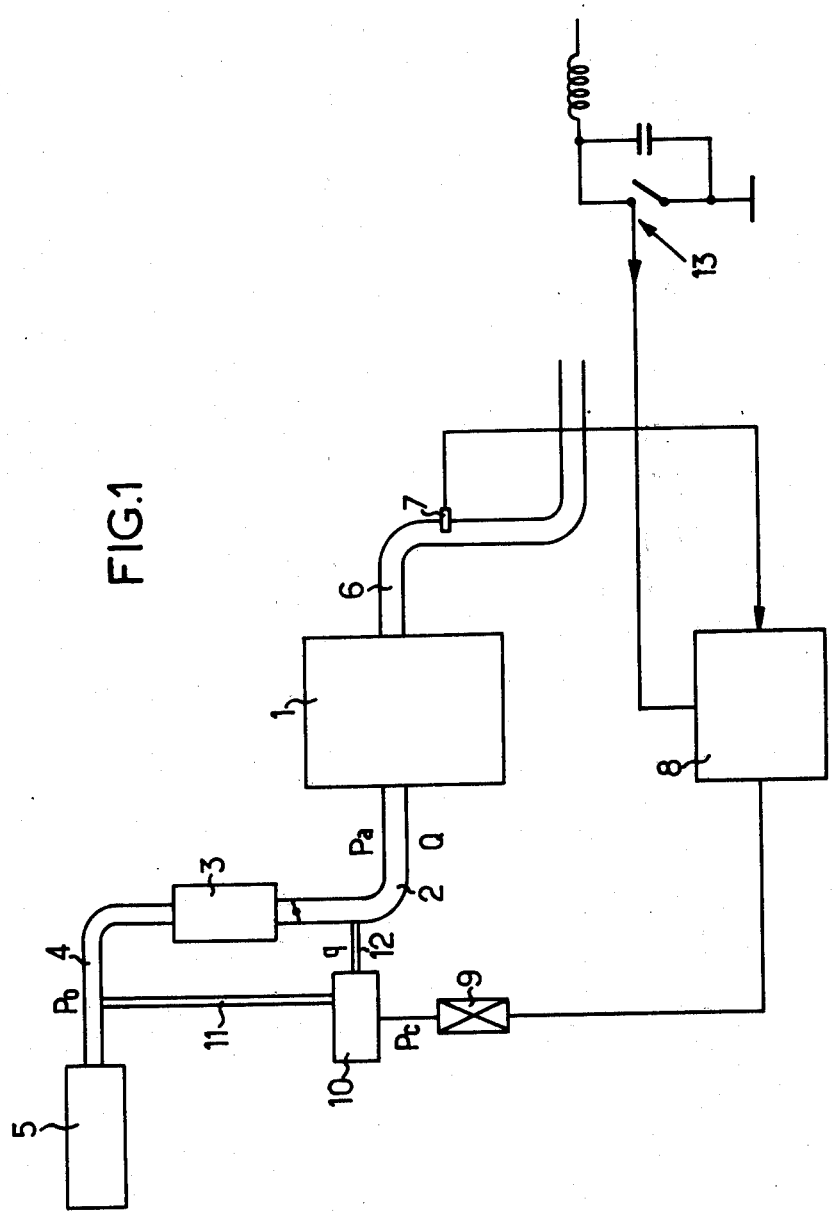
FIG. 1 is a diagrammatic illustration of the device as a whole.

As shown in FIG. 1, an internal combustion engine 1 aspirates combustible mixture from a carburettor 3 through an inlet manifold 2. The carburettor itself aspirates atmospheric air through an air inlet pipe 4 from an air filter 5. The engine expels exhaust gases through an exhaust pipe 6 containing an electric sensor 7 which analyses the exhaust gases. The sensor 7 can for example detect residual oxygen. The sensor responds to the presence of insufficient oxygen, due to imperfect functioning of the carburettor 3, by delivering a signal to an electronic system 8 which in turn applies an electric current to a command valve system 9. The system 9 delivers a pneumatic command pressure to a pneumatic regulator valve 10, which responds by allowing extra air to reach the engine through air ducts 11 and 12, by-passing the carburettor, to weaken the mixture. When the sensor 7 detects excess oxygen, the control operation is reversed. The electronic system 8 also responds to engine speed, as expressed by ignition frequency in an ignition circuit 13.

Up to this point what has been described is conventional practice in the arrangement of extra air injectors for internal combustion engines. The present invention is not concerned with this general arrangement, but with the construction of the electronic system 8, the command valve system 9 and the pneumatic regulator valve 10.

The pneumatic regulator valve 10 comprises two stages which function in series with each other to regulate the flow of extra air from the air inlet pipe 4 through the air duct 11 and the delivery duct 12 to the inlet manifold 2 of the engine. The air inlet pipe 4 contains air at a pressure $Po$ which is essentially atmospheric pressure. The manifold or pipe 2 contains mixture at a pressure $Pa$ which is always less than atmospheric. In passing from the air duct 11 to the extra air delivery duct 12 the air passes, in the interior of the pneumatic regulator valve 10, through a region of intermediate pressure $Pi$. The pneumatic regulator valve 10 is actuated by air at a command pressure $Pc$, which is determined by the action of the command valve system 9. A point which should be observed here is that, contrary to conventional practice, in the present invention the controlling pressure which influences the supply of extra air is not derived from the venturi of the carburettor. The depression in the carburettor venturi, that is to say the difference between atmospheric pressure and the pressure in the venturi, varies with the square of the rate of flow of aspirated air. In the present invention the controlling pressure is the pressure $Pa$ in the inlet pipe 2. This is always less than atmospheric pressure and varies, in practice, between 150 and 950 g/cm$^2$, the pressure varying with the mode of operation of the engine, in particular with the degree of opening of the butterfly valve of the carburettor. The intermediate pressure $Pi$ s of course between $Po$ and $Pa$. The command pressure $Pc$ is between $Pi$ and $Pa$, as will be explained later.

The downstream portion of the pneumatic regulator valve 10 is constructed to provide a passage, for the extra air, the cross-section of which varies in proportion to the pressure difference $Pc - Pa$. This is obtained by the action of a skirted cylindrical slide valve 14, which has a skirt 15 with slots 16. The skirt 15 slides axially to and fro in a stationary cylindrical sleeve 17 fixed in a transverse wall 18 which subdivides the body 19 of the regulator valve 10 into two portions. The slide valve 14 is connected by a rod 20 to a control diaphragm 21, which subdivides the body 19 into two compartments, a control pressure chamber 22 and a chamber 24 containing a spring 26. The chamber 22 has a control pressure connection 23 and contains air at the control pressure $Pc$. The chamber 24, which is limited by the control diaphragm 21 and the transverse wall 18, has a connection 25 and contains air at the mixture delivery pressure $Pa$. The connection 25 leads through the extra air delivery duct 12 to the mixture inlet pipe 2 of the engine, as shown in FIG. 1. The spring 26 thrusts at one end against the transverse wall 18 and at the other end against the central disc of the control diaphragm 21. The spring is calibrated so that its thrust is almost zero when the slots 16 in the cylindrical skirt of the slide valve 14 are completely closed, that is to say when $Pc = Pa$. The upstream face of the transverse wall 18 is in contact with air at the intermediate pressure $Pi$. Consequently, when the slots 16 are open, air flows from the right towards the left in FIG. 2 into the chamber 24, the rate of flow depending on the degree of opening of the slots 16. The rate of flow of extra air passing into the chamber 24 is therefore proportional to the distance through which the spring 26 is compressed and consequently proportional to the pressure difference $Pc - Pa$ acting on the control diaphragm 21.

Figure 2:
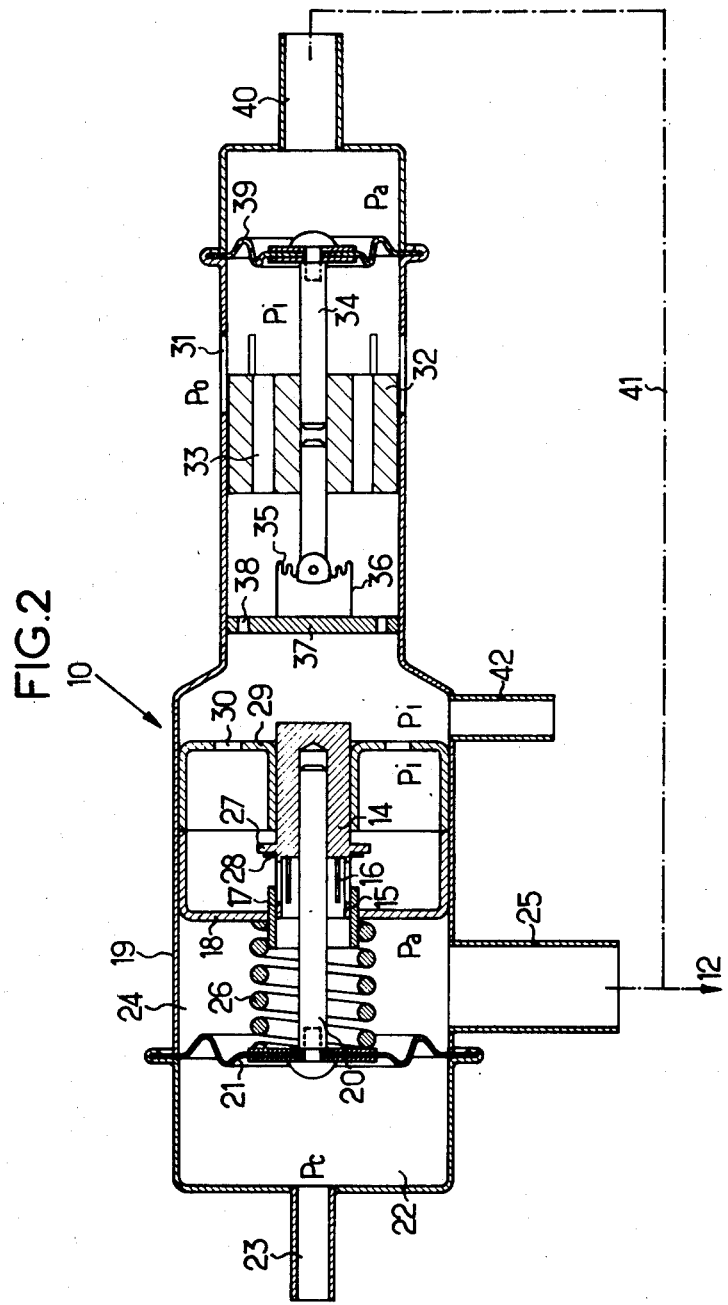
FIGS. 2, 3 and 4 are axial sections through three variants of a pneumatic regulator valve forming part of the device.

As shown in FIG. 2, the skirted slide valve 14 has a collar 27 supporting a sealing ring 28 which makes a seal against the end of the sleeve 17 when the spring 26 is fully relaxed, that is to say fully extended. The skirted slide valve 14 has a cylindrical end sliding axially in a sleeve projecting from a further transverse wall 29. The sleeve functions only as a mechanical guide, the transverse wall 29 having large apertures 30 which allow air to pass through freely to ensure that the air in contact with the upstream face of the transverse wall 18 is always at the intermediate pressure $Pi$. The cylindrical end of the skirted slide valve 14 need not make a seal with the sleeve of the transverse wall 29.

The pneumatic regulator valve 10 has an upstream portion which controls the intermediate pressure $Pi$ in such a way that the pressure difference $Pi - Pa$ is, as nearly as possible, proportional to $Pa$.

For this purpose, as shown at the right in FIG. 2, the upstream portion of the body 19 of the pneumatic regulator valve 10 has longitudinal outer slots 31 cooperating with a cylindrical slide valve 32, which slides axially to and fro in the body 19, uncovering varying lengths of the slots 31. In the region of the slots 31 the outer surface of the body 19 is in contact with air at the pressure $Po$. For example this portion of the pneumatic regulator valve 10 can be housed in the interior of the air filter 5. The cylindrical slide valve 32 has a number of longitudinal communicating passages 33 which allow air, at the pressure $Pi$ to flow longitudinally through the cylindrical slide valve, which therefore has the same pressure $Pi$ on both sides.

In the downstream direction, the piston-like slide valve 32 is connected by a rod 34 (which may have a separate part as shown in FIG. 2) to the diaphragm 35 of a vacuum capsule 36 which is attached to a transverse wall 37 fixed in the interior of the body 19. The transverse wall 37 has apertures 38 to allow air to pass through. The capsule 36 is evacuated. In the upstream direction, the cylindrical slide valve 32 is connected by the rod 34 to a balance diaphragm 39, the downstream face of which is in contact with air at the pressure $Pi$ and the upstream face of which is in contact with air at the mixture delivery pressure $Pa$. The upstream end of the pneumatic regulator valve 10 has a connection 40 which leads through a communicating duct 41 to the extra air delivery duct 12 which contains air at the mixture delivery pressure $Pa$. The two diaphragms 39 and 35 cooperate as follows: A positive thrust proportional to P$i$ – P$a$ (because P$i$ is greater than P$a$) thrusts the balance diaphragm 39 in the upstream direction, that is to say towards the right in FIG. 2. This thrust is opposed by the capsule diaphragm 35, which is thrust towards the left by the pressure P$i$. Consequently the ratio (P$i$ – P$a$)/P$i$ remains constant, depending only on the working areas of the two diaphragms. It follows that the ratio P$a$/P$i$ remains constant. The difference P$i$ – P$a$ is therefore proportional to P$a$ and also to P$i$. The intermediate pressure P$i$, regulated as just described, is made available for other purposes by a tap-out connection 42 on the body 19.

Figure 3:
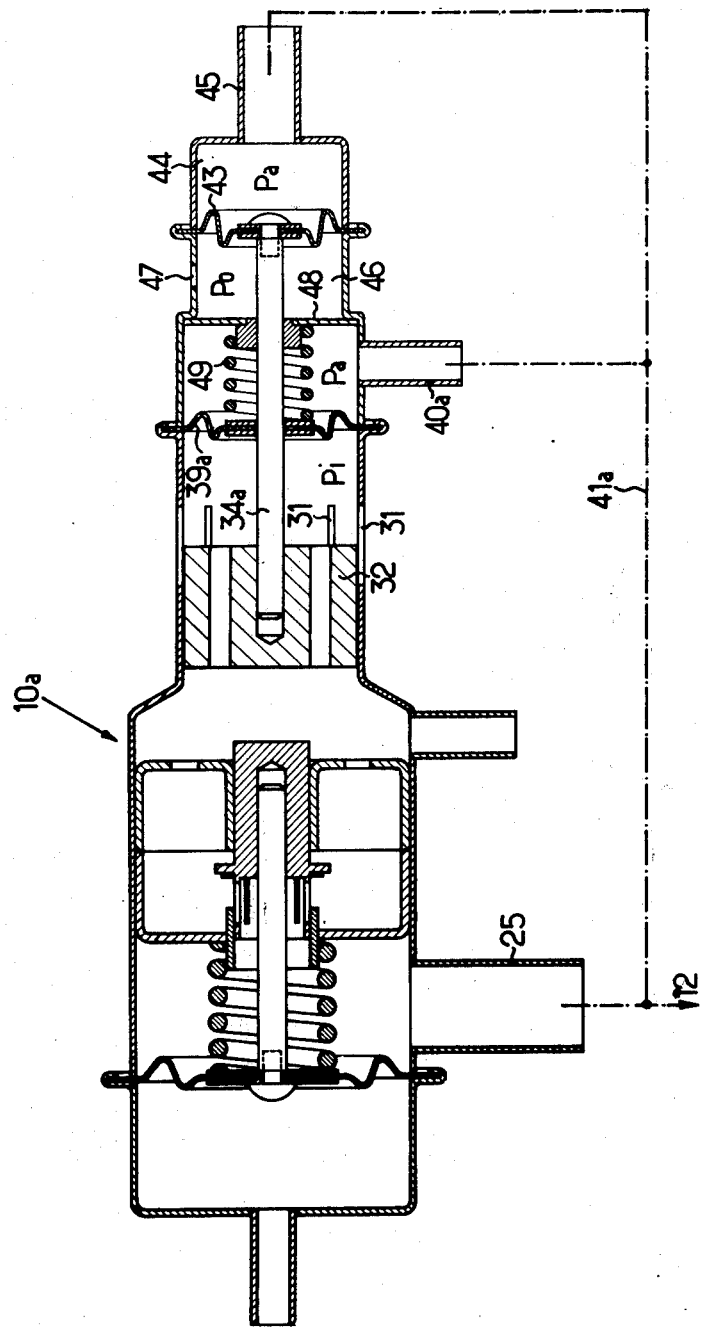

In the variant represented in FIG. 3, the downstream portion of the pneumatic regulator valve 10$a$ is exactly the same as in FIG. 2, but the upstream portion is simplified by leaving out the vacuum capsule 36. As in FIG. 2, there is a cylindrical slide valve 32 which is connected by a rod 34$a$ to a balance diaphragm 39$a$ the downstream face of which is in contact with air at the intermediate pressure P$i$ and the upstream face of which is in contact with air at the mixture delivery pressure P$a$, which is transmitted from the extra air delivery duct 12 through a communicating duct 41$a$ and a connection 40$a$. The rod 34$a$, the downstream end of which is fixed in the cylindrical slide valve 32, extends upstream as far as an auxiliary diaphragm 43, to which the end of the rod 34$a$ is attached. The downstream face of the auxiliary diaphragm 43 is in contact with air at the pressure P$o$ in a chamber 46 which has an outer aperture 47 in communication with the atmosphere. The upstream face of the auxiliary diaphragm 43 is in contact with air at the mixture delivery pressure P$a$, the upstream end of the pneumatic regulator valve 10 having a connection 45 which communicates through the duct 41$a$ with the extra air delivery duct 12 of the system. Thus in the variant of FIG. 3, the three connections 45, 40$a$ and 25 all communicate, via the communicating duct 41$a$, with the extra air delivery duct 12, in the same way as in FIG. 2 the two connections 40 and 25 are connected by the communicating duct 41 to the duct 21, which delivers extra air to the engine. In FIG. 3 it will be observed that the chamber 46, containing air at the source pressure P$o$, is separated downstream by a stationary transverse wall 48 from the air at the pressure P$a$ which is in contact with the upstream face of the balance diaphragm 39$a$. The rod 34$a$ slides axially to and fro in a bush fixed to the transverse wall 48, the bush forming a good pneumatic seal with the sliding rod. A spring 49 thrusts upstream against the transverse wall 48 and downstream against the balance diaphragm 39$a$. The spring 49 is calibrated to give, as nearly as possible, a constant spring thrust which is substantially equal to the source pressure P$o$ (atmospheric pressure) multiplied by the working area of the auxiliary diaphragm 43. The spring 49 therefore exactly compensates the thrust of the air, at pressure P$o$, against the downstream face of the auxiliary diaphragm 43. The pressure ratio (P$i$ – P$a$)/P$a$ therefore remains constant, depending only on the ratio of the working areas of the two diaphragms 39$a$ and 43. The pressure ratio P$i$/P$a$ therefore also remains constant.

Figure 4:
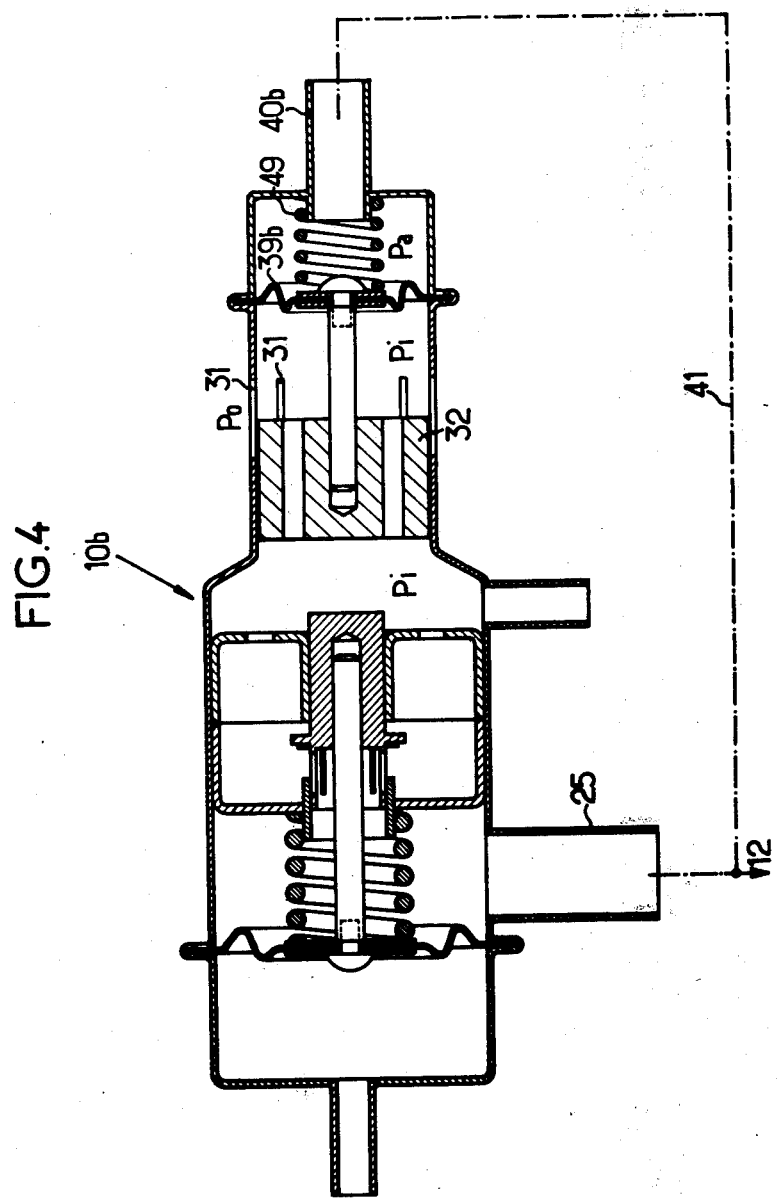

The variant shown in FIG. 4 is still further simplified. The downstream portion of the pneumatic regulator valve 10$b$ remains the same. The upstream portion is generally similar to the variant of FIG. 3 but the auxiliary diaphragm 43 is eliminated. Consequently the intermediate pressure P$i$ is constant whereas in FIG. 3 it is proportional to P$a$. Nevertheless in practice, as will be explained later on, this variant does control the flow of extra air with an accuracy which is adequate.

Figure 5:
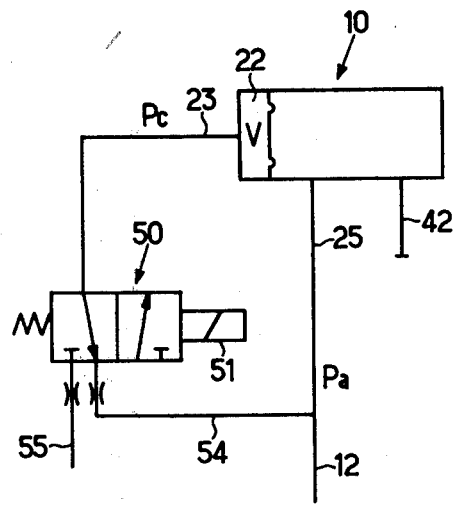
FIGS. 5, 6, 7 and 8 are function diagrams illustrating the modes of operation of four variants of a command valve system, which forms part of the device.
Figure 6:
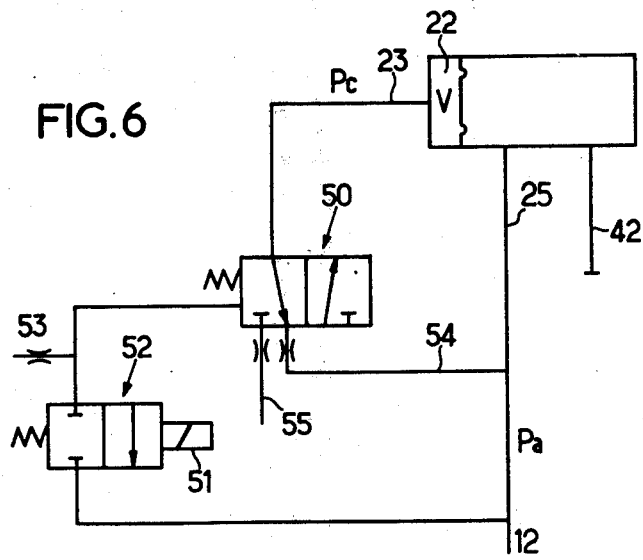
Figure 7:
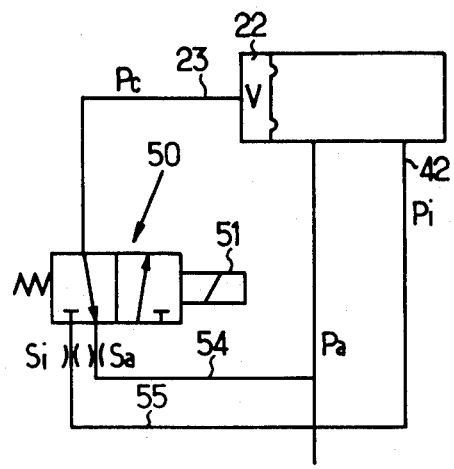
Figure 8:
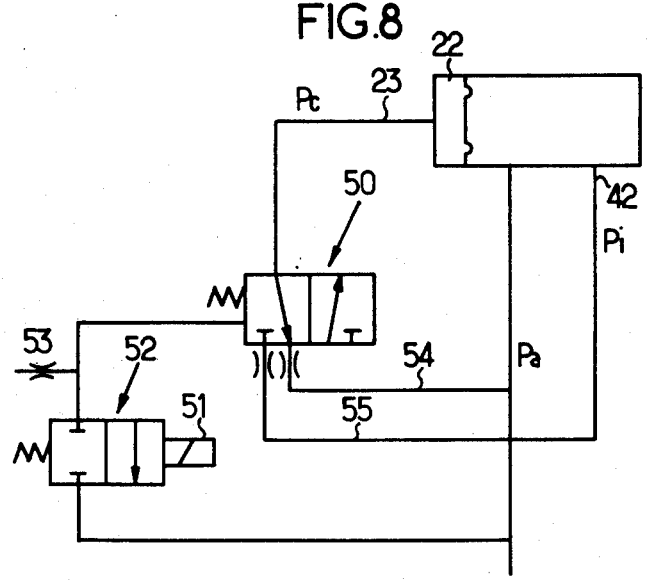

A second feature of the invention is concerned with the command valve system 9 shown in FIG. 1. The function of the command valve system 9 is to control the pneumatic command pressure P$c$. As shown in FIGS. 5, 6, 7 and 8, the command valve system 9 comprises a three-way pneumatic valve 50 actuated, as shown in FIGS. 5 and 7, directly by a solenoid 51. The three-way valve 50 is an all-or-nothing valve, that is to say it is not graduated in its action. In FIGS. 6 and 8 the three-way valve 50 is not actuated directly by its own solenoid but by a command suction in the form of the low pressure P$a$ applied by a two-way master valve 52, which is itself actuated by a solenoid 51. The two-way master valve 52 applies the low pressure P$a$ to the three-way valve 50 through a duct from which is branched a bleed orifice 53 communicating with the atmosphere, so that when the two-way master valve 52 is closed, the low pressure P$a$ applied as a command suction to the three-way valve 50 increases to atmospheric pressure so that the command suction fades away to nothing.

The action of the three-way valve 50, irrespective of whether it is actuated directly by its own solenoid as in FIGS. 5 and 7 or by suction as in FIGS. 6 and 8 is as follows: When the three-way valve 50 is de-energised, as shown in the drawings, the control pressure chamber 22 of the pneumatic regulator valve 10 is connected through the duct 23 and a duct 54 to air at the low pressure P$a$ in the duct 12, which is connected to the extra air delivery outlet 25 of the regulator valve 10. On the other hand, when the three-way valve 50 is energised the chamber 22 is connected through the duct 23 and a duct 55 to air at the higher intermediate pressure P$i$ in a connection 42, as shown in FIGS. 7 and 8, or to the atmosphere as shown in FIGS. 5 and 6, in which case the connection 42 is plugged. Connection to the connection 42 is preferable, because the average command pressure P$c$ is more nearly equal to P$i$ than P$o$.

The three-way valve 50 is an all-or-nothing valve, irrespective of whether it is actuated directly or indirectly. When the three-way valve 50 is in operation it oscillates at low frequency between its two alternative positions, connecting the chamber 22 alternately to air supplies at the two pressures P$a$ and P$c$. If the three-way valve 50 were to switch over and then stay in its new position it would take a certain length of time for the chamber 22 to acquire the new pressure. The delay time before equilibrium is reached can be calculated from the volume V of the chamber 22, the speed $c$ of sound in air at the pressure P$i$ and the smallest cross-section S$a$ or S$i$ of the two passages 23, 54 or 23, 55, as indicated in FIG. 7.

Figure 13:
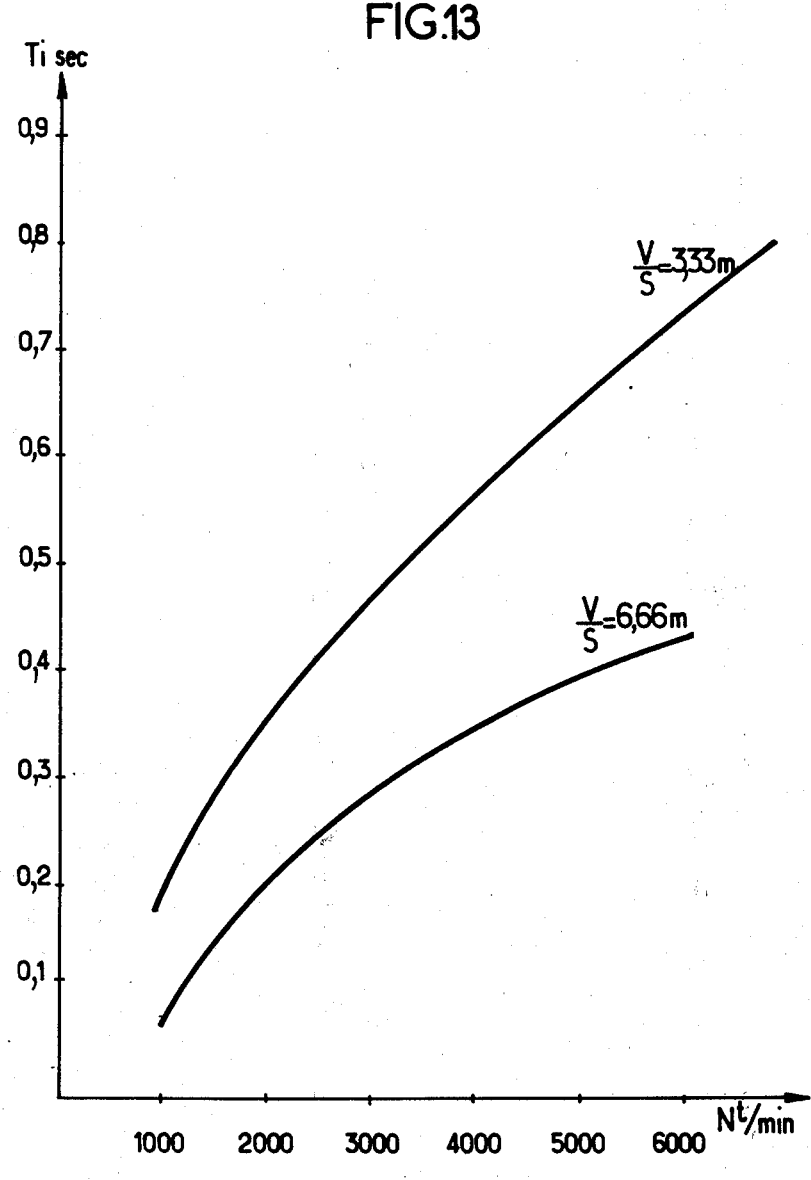
FIG. 13 is a graph showing in two variants, a period of current flow as a function of the speed of an engine to which the device is fitted.

The electronic system 8 delivers to the solenoid 51 of the command valve system 9 a low-frequency signal of square wave form (see FIG. 12) which satisfies the following three requirements: Firstly, the mark period T$i$, during which current flows through the solenoid, must be less than the time taken to fill the chamber 22 up to the pressure P$i$, and the space period T$a$, during which no current flows, must be less than the time taken to empty the chamber 22 down to the low pressure P$a$. Secondly, the emptying of the chamber must preponderate over the filling. Thirdly, the rate of flow $q$ of extra air must be at least substantially, and in practice as nearly as possible, proportional to the rate of flow Q of mixture aspirated by the engine. The three conditions are satisfied provided that:

$$Ti = \frac{15}{8} \quad \frac{2V}{c(Si + Sa)} \quad \sqrt{\frac{Pi - Pa}{\gamma 2\, Pa}}$$

$$\left[\sqrt{1 + \frac{64}{75} \quad \frac{A\, Pa\, N}{Pi - Pa}} - 1\right]$$

and $Ta \geqq Ti \frac{Pi}{Pa} \frac{Si}{Sa}$ where δ is the ratio of the specific heats of the gases at constant pressure and constant volume, N is the speed of rotation of the engine and A is a coefficient which depends only on the dimensions of the regulator valve 10. It will be recalled that the upstream portion of the regulator valve 10 keeps the ratio (P$i$ - P$a$)/P$a$ constant. The mark period T$i$ therefore depends in practice only on the speed of rotation N of the engine. FIG. 13 shows the behaviour of T$i$ with changing engine speeds, for two different ratios V/S or 2V/(S$i$+S$a$).

If the two cross-sections are the same, that is if S$i$ = S$a$, then to ensure that emptying preponderates over filling T$a$ must be longer than T$i$, although the ratio T$i$/T$a$ remains constant because the upstream portion of the regulator valve 10 keeps the ratio P$i$/P$a$ constant. But to simplify the construction of the electronic system 8 it is better to keep the two periods the same, so that T$i$ = T$a$ and to make the cross-section S$a$ greater than S$i$, so that emptying nevertheless preponderates over filling. As an example, in the arrangement shown in FIGS. 7 and 8 the ratio S$a$/S$i$ = P$i$/P$a$ = 1.08. If P$o$ is used instead of P$i$, as in FIGS. 5 and 6., the ratios are of course greater.

Figure 9:
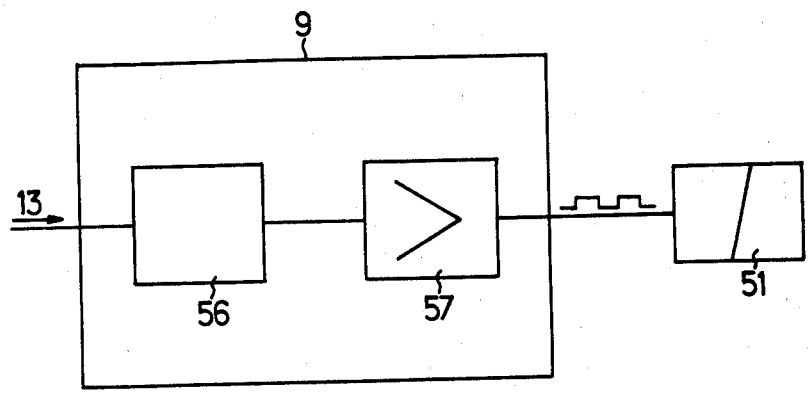
FIG. 9 is a simplified diagram of a simplified electronic circuit diagram of the device.
Figure 11:
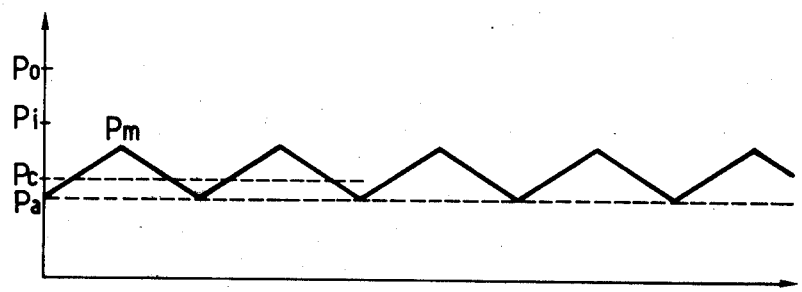
FIG. 11 is a graph illustrating the behaviour of the pneumatic control pressure produced by the device from instant to instant.
Figure 12:
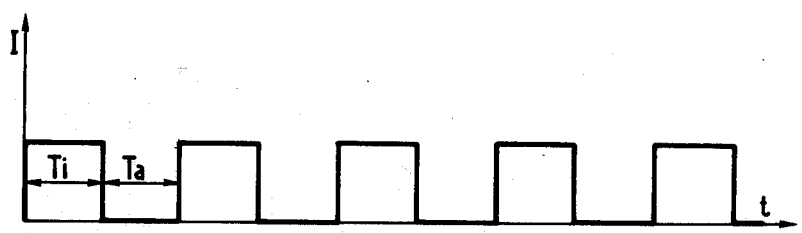
FIG. 12 is a graph illustrating the behaviour of a controlling electric current, as a function of time.

Finally, for constructing the electronic system 8 which produces the signal of square wave form for the solenoid 51, the frequency of which depends on engine speed in such a way that the mark period T$i$ is as presented by one of the two curves in FIG. 13, it is merely necessary to use, as shown in FIG. 9, a frequency-to-time transducer 56 which derives engine speed from the frequency of the pulses delivered by an interrupter 13 (see FIG. 1). The frequency-to-time transducer 56 comprises a digital or analogue current generator which delivers a pulsed current, symmetrical or asymmetrical, at a frequency which depends on engine speed. The signal, after amplification in an amplifier 57, is applied to the solenoid 51 of the command valve system 9. FIG. 12 represents the behaviour of a symmetrical pulsed current as a function of time. In this case T$i$ = T$a$ and therefore the passage cross-sections S$i$ and S$a$ must differ from each other. The resulting behaviour of the pressure in the chamber 22 is represented in FIG. 11 and will now be described.

In the chamber 22 the emptying preponderates over the filling, either becuase T$a$ is longer than T$i$, or because S$a$ is greater than S$i$. Consequently the pressure oscillates between a low pressure P$a$ and a higher pressure P$m$ which is less than P$i$. The peak pressure P$m$ varies with the length of the period T$i$, because this period is never long enough to allow the chamber 22 to fill completely up to the pressure P. The average command pressure P$c$ consequently also varies with the period T$i$, which is itself a function of the frequency of the pulsed current.

Figure 10:
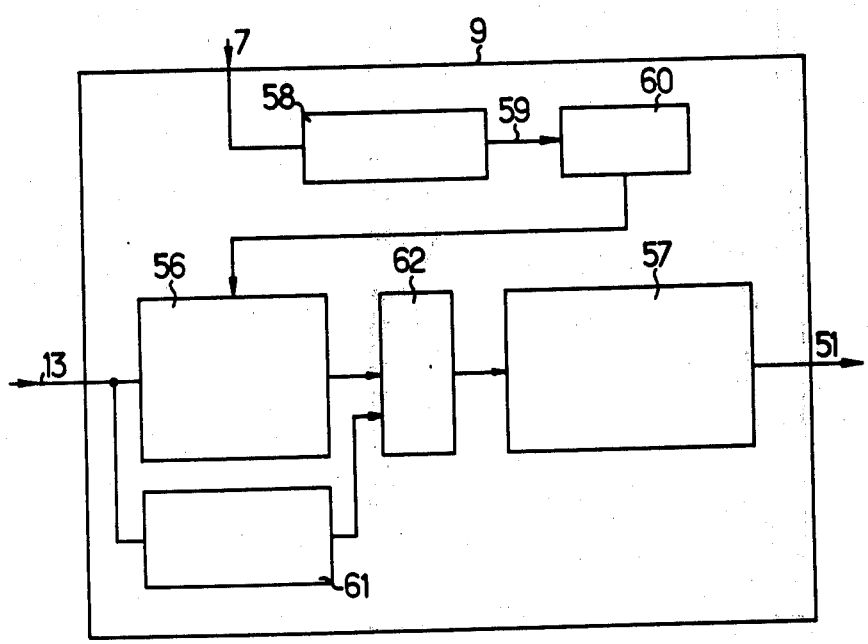
FIG. 10 is a complete block diagram of an electronic system forming part of the device.

The electronic system 8 is also influenced by signals from the exhaust gas composition sensor 7, which acts by changing the frequency of the pulsed current. As shown in FIG. 10, the variable voltage delivered by the sensor 7 is fed to a voltage comparator 58 the action of which is governed by a threshold voltage which corresponds exactly to a predetermined oxygen concentration in the exhaust gases. The voltage comparator 58 delivers, over its output terminal 59, a voltage signal which varies between two values. When the oxygen concentration is below the threshold value the voltage delivered by the comparator 58 is zero. As soon as the oxygen concentration exceeds the threshold value the comparator 58 delivers an output signal at a predetermined voltage.

Figure 14:
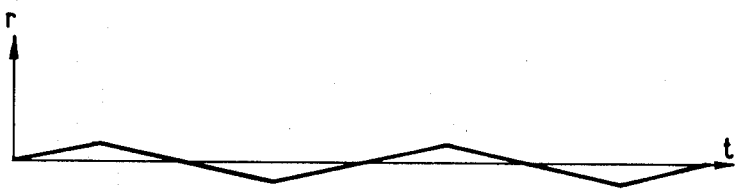
FIG. 14 is a graph representing mixture richness as controlled by the device, as a function of time.
Figure 15:
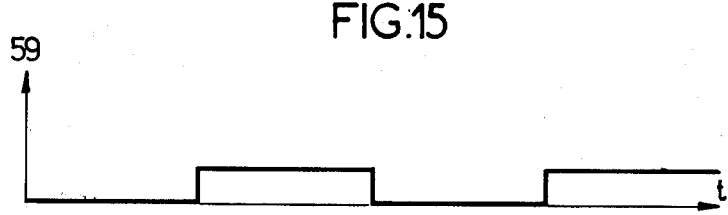
FIG. 15 is a graph showing the voltage delivered by an exhaust gas composition sensor forming part of the device, as a function of time.
Figure 16:
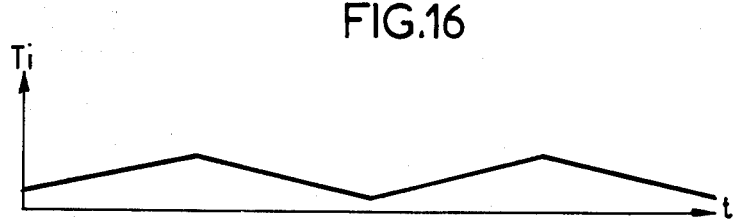
FIG. 16 is a graph showing a slow variation of the period of current flow resulting from the action of the electronic system of the device, engine speed being assumed constant.

An example of the result obtained is shown in FIG. 14. In this Figure richness $r$ is represented on the ordinate and time on the abscissa. The horizontal straight line represents the ideal mixture richness. When the mixture is too rich, that is to say when there is insufficient oxygen in the exhaust gases, the comparator 58 delivers no voltage on its output terminal 59, as represented on the left in FIG. 15. On the other hand, when the mixture is too weak, excess oxygen shows up in the exhaust gases and the comparator 58 delivers a voltage on its output terminal 59. In the practical operation of an engine, it is necessary to ensure that the frequency of the pulsed square wave form current, and therefore the length of the period T$i$, changes reasonably gradually. For this purpose the signal from the terminal 59 is fed to an integrator 60 which is influenced by a time constant and delivers a varying signal to the frequency-to-time transducer 56. This is usually an analogue signal but it can if desired be a digital signal. The transducer 56 therefore changes the length of the period T$i$ by superimposing its own influence on the influence of engine speed. FIG. 16 shows the resulting change in T$i$, as a function of time. When there is no voltage on the terminal 59, corresponding to a rich mixture, the flow $q$ of extra air increases gradually. The flow subsequently decreases gradually when a voltage appears on the terminal 59, that is to say when the mixture is too weak.

The electronic system 8 is completed by an electronic tachometer 61, which interrupts the flow of extra air under certain operational circumstances. The electronic tachometer 61 derives engine speed from the frequency of the ignition current delivered by the interrupter 13 and shuts off the flow of extra air by actuating a gate or logic block 62 interposed between the transducer 56 and the amplifier 57. The supply of extra air is interrupted, in particular, when engine speed decreases to near idling speed, for example when it falls below 1300 rpm, and also when engine speed increases to a very high value, for example to above 5000 rpm. Above that speed no extra air is required. The logic block 62 can if desired by influenced by other kinds of data, for example so that the feed of extra air is interrupted by a contact when the accelerator pedal is fully retracted or released so that no extra air flows in during deceleration of the engine.

To summarise, the present invention ensures, without using costly devices, that very good and often almost perfect results are obtained in mixture control with the help of the pneumatic regulator valve shown in FIGS. 2 and 3, and very satisfactory results are even obtained using the simpler regulator valve shown in FIG. 4. In this evaluation it should be borne in mind that the rate of flow $q$ of extra air is only 5 to 10% of the rate of flow Q of the mixture aspirated by the engine. Consequently variation of the mixture delivery pressure P$a$ produces comparatively small relative variations and still allows the exhaust gas composition sensor to apply corrections with sufficient sensitivity.

I claim:

1. In an electro-pneumatic device for controlling the supply of additional air to an internal combustion engine to regulate the richness of the combustible mixture in said engine, said device including a suction-controlled valve, an electrically-operated valve operatively connected to said suction-controlled valve, a sensor for sensing the composition of exhaust gases from said engine and an electronic device, which is responsive to engine speed and to signals from said sensor, operatively connected to said electrically-operated valve, said suction-controlled valve being arranged to deliver extra air at predetermined rates of flow to said engine downstream of a carburettor of said engine, the improvement wherein said electro-pneumatic device further comprises:
   a. pneumatic regulator valve means, said valve means including an upstream stage in which, in operation, air pressure decreases from atmospheric pressure to an intermediate pressure, and a downstream stage in which, in operation, air pressure decreases from said intermediate pressure to a mixture delivery pressure at which combustible mixture is aspirated by said engine, each of said stages including a slide valve and at least one diaphragm actuating said slide valve, means defining a passage controlled by said downstream stage, said downstream stage opening said passage by an amount proportional to the difference between a command pressure and said mixture delivery pressure, and said upstream stage controlling the difference between said intermediate pressure and said mixture delivery pressure to maintain said difference substantially constant or proportional to said mixture delivery pressure;
   b. a command valve system including means defining a chamber in which said command pressure is generated, first passage means communicating said chamber with a source of said intermediate pressure or with atmosphere, second passage means communicating said chamber with a source of said mixture delivery pressure, and means alternately connecting said chamber through said first passage means for a first period to said source of said intermediate pressure or to atmosphere and during a second period through said second passage means to said source of said mixture delivery pressure; and
   c. an electronic system operative to produce an electric signal having a square wave form and means for applying said signal to said command valve system, said signal having a square wave form, the mark/space ratio of which is constant and the mark period of which is a function of the speed of said engine as indicated by the ignition frequency of said engine and a function of a signal delivered by said exhaust gas composition sensor, said function being such that the rate of flow of said additional air supply is at least substantially proportional to the rate of flow of a main stream of air aspirated by said engine, said mark/space ratio and the cross-sections of said first and second passage means satisfying requirements imposed by the constancy of parameters imposed by said pneumatic regulator valve and the requirements that each mark period is less than the time taken for said chamber in which said command pressure is generated to fill completely or empty completely, and that emptying preponderates over filling.

2. A device as claimed in claim 1, wherein said slide valve of said downstream stage of said pneumatic regulator valve is cylindrical and includes a skirt having means defining a plurality of equally spaced axially extending slots therein.

3. A device as claimed in claim 1, wherein said upstream stage of said pneumatic regulator valve includes means defining a plurality of equally spaced longitudinal slots, two diaphragms and means fixing said valve of said upstream stage to said diaphragms, said intermediate pressure acting on one face of a first of said diaphragms to act on said slide valve in a direction to close said slots, said mixture delivery pressure acting on the other face of said first diaphragm in a direction to open said slots, said intermediate pressure acting on one face of said second diaphragm, which has a smaller working area than said first diaphragm, in a direction to open said slots and vacuum means acting on the other face of said second diaphragm in a direction to close said slots.

4. A device as claimed in claim 1, wherein said upstream stage of said pneumatic regulator valve includes means defining a plurality of equally spaced longitudinal slots, two diaphragms and means connecting said slide valve of said upstream stage to said diaphragms, said intermediate pressure acting on one face of a first of said diaphragms to act on said slide valve in a direction to close said slots, said mixture delivery pressure acting on the other face of said first diaphragm, atmospheric pressure acting on one face of a second of said diaphragms to act on said slide valve in a direction to close said slots and said mixture delivery pressure acting on the other face of said second diaphragm, said pneumatic regulator valve also including return spring means acting on said slide valve of said upstream stage in a direction to open said slots, said return spring means producing a thrust corresponding to a thrust applied by the atmosphere to said second diaphragm.

5. A device as claimed in claim 1, wherein said upstream stage of said pneumatic regulator valve includes means defining a plurality of equally spaced longitudinal slots, a diaphragm, and means connecting said slide valve of said upstream stage to said diaphragm, said intermediate pressure acting on one face of said diaphragm to apply a thrust to said slide valve of said upstream stage in a direction to close said slots, said mixture delivery pressure acting on the other face of said diaphragm, and said pneumatic regulator valve further comprising return spring means acting on said slide valve of said upstream stage in a direction to open said slots.

6. A device as claimed in claim 1, further comprising a three-way valve operatively connected to control delivery of said command pressure, and a solenoid operatively connected to actuate said three-way valve.

7. A device as claimed in claim 1, further comprising a suction-operated valve for controlling the delivery of said command pressure, suction means for applying suction to said suction-operated valve, a two-way electrically-operated valve for controlling the actuation of said suction-operated valve by said suction means and solenoid means for actuating said two-way electrically-operated valve, said two-way electrically-operated valve being operative to apply said mixture delivery pressure to said suction-operated valve and means defining a duct through which said command pressure is delivered under the control of said suction-operated valve, and means defining a calibrated bleed orifice communicating said duct to atmosphere.

8. A device of claimed in claim 1, wherein said electronic system includes a logic circuit, an electronic tachometer arranged to be driven by said engine and means electrically connecting said tachometer to said logic circuit to produce interruptions in said signal of square wave form whereby the injection of said additional air is effected whenever the speed of said engine falls below a first threshold value or rises above a second threshold value.

9. A device as claimed in claim 8, wherein said logic circuit includes an extra contact and means for operating said contact in response to movement of an accelerator pedal of a vehicle powered by said engine.

10. A device as claimed in claim 1 wherein said space period is longer than said mark period, so that said mark/space ratio is less than unity, thereby satisfying the requirement that emptying preponderates over filling.

11. A device as claimed in claim 1 wherein said second passage means has a greater cross section than said first passage means, whereby emptying preponderates over filling.

12. In an electro-pneumatic device for controlling the supply of additional air to an internal combustion engine to regulate the richness of the combustible mixture in said engine, said device including a suction-controlled valve, an electrically-operated valve operatively connected to said suction-controlled valve, a sensor for sensing the composition of exhaust gases from said engine, and an electronic device, which is responsive to engine speed and to signals from said sensor, operatively connected to said electrically-operated valve, said suction-controlled valve being arranged to deliver extra air at predetermined rates of flow to said engine downstream of a carburettor of said engine, the improvement wherein said electro-pneumatic device further comprises:

a. pneumatic regulator valve means comprising part of said suction-controlled valve, for decreasing air pressure in an upstream stage from substantially atmospheric pressure, at which air enters said suction-controlled valve, to an intermediate lower pressure, and for decreasing pressure in a downstream stage from said intermediate pressure to a mixture delivery pressure at which a combustible mixture is aspirated by said engine, said valve means including at each said stage a slide valve and at least one diaphragm actuating said slide valve, said valve means regulating the flow to said downstream stage to provide a flow therethrough proportional to the difference between a command pressure and said mixture delivery pressure, said valve means also, at said upstream stage, controlling the difference between said intermediate pressure and said mixture delivery pressure so that it is proportional to said mixture delivery pressure;

b. a command valve system comprising part of said electrically-operated valve including means for generating said command pressure including a chamber having first passage means connected with a source pressure no less than said intermediate pressure and no greater than atmospheric pressure, second passage means connected with a source of said mixture delivery pressure, and valve means alternately connecting said chamber to said first passage means only for a first period and during a second period to said second passage means; and c. said electronic device comprising means for producing an electric signal having a square wave form and for applying said signal to said command valve system to control said command signal, said signal having a square wave form, the mark/space ratio of which is constant, the mark period being a function of the speed of said engine as indicated by the ignition frequency of said engine and a function of a signal delivered by said exhaust gas composition sensor, said function being such that the rate of flow of said additional air supply from said suction-controlled valve is at least substantially proportional to the rate of flow of a main stream of air aspirated by said engine, said mark/space ratio and satisfying the requirements (1) that each mark period be less than the time taken for said chamber in which said command pressure is operated to fill completely or empty completely and (2) that emptying preponderates over filling.

13. A device according to claim 12 wherein said electronic device maintains said mark/space ratio at less than unity, so that emptying preponderates over filling.

14. A device according to claim 12 wherein said second passage means has a greater cross section than said first passage means, so that emptying preponderates over filling.

15. A device according to claim 12 wherein said first passage means is connected to said pneumatic regulator valve means in between said upstream and downstream stages so that it is at said intermediate pressure.

16. A device according to claim 12 wherein said first passage means is connected to atmosphere.

* * * * *